United States Patent
Vaughan

(10) Patent No.: US 6,823,600 B1
(45) Date of Patent: Nov. 30, 2004

(54) ADJUSTABLE FIT LASER-PROJECTING REFERENCE TOOL

(75) Inventor: Jason Michael Vaughan, 65 Ronlroff Dr., North Tonawanda, NY (US) 14120

(73) Assignee: Jason Michael Vaughan, North Tonawanda, NY (US)

(*) Notice: Subject to any disclaimer, the term of this patent is extended or adjusted under 35 U.S.C. 154(b) by 0 days.

(21) Appl. No.: 10/373,372

(22) Filed: Feb. 24, 2003

Related U.S. Application Data

(60) Provisional application No. 60/361,648, filed on Mar. 4, 2002.

(51) Int. Cl.[7] .............................................. G01B 11/26
(52) U.S. Cl. ............................ 33/288; 33/373; 33/412; 33/529; 33/520; 33/DIG. 21
(58) Field of Search .......................... 33/286, 370–371, 33/373, 412, 529, 520, 844, 542, 544, DIG. 21

(56) References Cited

U.S. PATENT DOCUMENTS

| | | | | |
|---|---|---|---|---|
| 659,513 A | * | 10/1900 | Dubus | ......................... 33/353 |
| 1,020,020 A | * | 3/1912 | Brawley | ....................... 33/371 |
| 3,694,100 A | * | 9/1972 | Blair | ............................ 33/644 |
| 4,216,587 A | * | 8/1980 | Stone | ........................... 33/412 |
| 4,516,328 A | * | 5/1985 | Massey | ....................... 33/412 |
| 5,074,509 A | * | 12/1991 | Van Orden | ................... 33/286 |
| 5,479,718 A | * | 1/1996 | Cook | ........................... 33/412 |
| 6,052,911 A | * | 4/2000 | Davis | .......................... 33/286 |
| 6,105,264 A | * | 8/2000 | Phillips | ................. 33/DIG. 21 |
| 6,389,709 B1 | * | 5/2002 | Lunde | .......................... 33/373 |
| 2002/0174553 A1 | * | 11/2002 | Dolezal et al. | ............... 33/373 |

* cited by examiner

*Primary Examiner*—Diego Gutierrez
*Assistant Examiner*—Madeline Gonzalez

(57) ABSTRACT

An adjustable fit laser-projecting tool used to project a light beam outward from the end of any cylindrical object for reference to the object's centerline axis or reference to points parallel to the centerline axis some distance away from the cylindrical object. The tool is comprised of a clamping means utilizing the outer surface of the cylindrical object as the contact surface. The tool contacts the outer surface of a cylindrical object as to orient the tool to the centerline of the cylindrical object. A laser diode module is mounted on a sliding centering scale, allowing the laser diode module to be moved to the centerline of the cylindrical object or another desired position parallel to the centerline axis of the cylindrical object.

3 Claims, 7 Drawing Sheets

ADJUSTABLE FIT LASER-PROJECTING REFERENCE TOOL

CROSS-REFERENCE TO RELATED APPLICATION

This application claims the benefit of Provisional Patent Application Ser. No. 60/361,648 filed 2002 Mar. 4.

FEDERALLY SPONSORED RESEARCH

Not Applicable

SEQUENCE LISTING OF PROGRAM

Not Applicable

BACKGROUND

1. Field of Invention

This invention relates to a tool used to aid in the visual referencing of points or planes while manufacturing, fabricating, installing, dimension taking or similar activities involving the centerline axis of cylindrical objects.

2. Description of Prior Art

While cylindrical objects such as pipes, conduit, ductwork and equipment are used both commercially and residentially, there is a required amount of skill and effort that goes into their correct placement, fabrication, and installation. A person skilled in trades working around cylindrical objects commonly uses levels, tape rulers, string, plumb bobs, carpenter squares, and other straight and square edges to aid their activities. Using these tools can result in easy errors and requires additional manpower. In some cases, multiple persons may be required to aid in the placement, fabrication, installation and associated tasks while working with cylindrical objects. This adjustable fit laser projecting tool will improve the accuracy of these tasks and reduce manpower requirements for obtaining the desired results. The adjustable fit laser-projecting tool will allow a single user to generate visual reference points, plane, or planes projecting perpendicular to a cylindrical object's cross sectional plane within the outer diameter of said cylindrical object parallel to and including the longitudinal centerline axis of said cylindrical object, thus by making reference information easier and faster to obtain for the user. Both set up and utilization of this adjustable fit laser-projecting tool requires only one person. Therefore, a single user will not require the aid of additional persons to obtain information; which in the past was done with persons using levels, tape rulers, folding rulers, string, plumb bobs, carpenters squares, and other straight and square edges.

U.S. Pat. Nos. 5,461,793 to Melville (1995) and 5,359,781 to Melville (1994) show a self-centering pipe axis laser guide. This device uses three links separated by 120 degrees that can be inserted into a pipe and expanded outward until the links push against the internal surfaces of the pipe. Melville's device finds the center from pushing equally on the internal surfaces with three linkages. Melville's self-centering pipe axis laser guide contacts the internal surfaces of small diameter pipes, less than 6 inch diameter, which are not easily accessible to visual inspection with the device inserted. Melville's device makes it difficult to visually verify that the contact surfaces are correctly engaged. Differences, on the order of nude in single thousands of an inch, can greatly affect the angular offset of the visible laser reference beam as it is projected outward along the centerline axis off of the pipe face. Internal surface inconsistencies, such as a weld bead or extrusion mark, to the pipe, are not visually apparent and may cause Melville's device to engage the contact surfaces inaccurately, resulting in horizontal vertical or angular offset without the user being aware. Surface contact on the external side of any cylindrical object can be verified for correctness by checking the contact surfaces using visual inspection with thickness feeler gages or measuring devices.

Melville's self-centering pipe axis laser guide requires a specific internal contact surface length. The required contact length of the device limits the applications of the device. The device cannot be applied to applications having limited internal length or applications with internal obstructions. Melville's self-centering pipe axis laser guide can be "cradled" on top of the pipe for making alignment measurements when the interior is obstructed, however, used in this way the device would not project a beam along the centerline axis and cannot be considered self-centering as used in this way. A device using internal surfaces to center the device may not fit applications where internal components such as pump impellers, turbines, mixing baffles, vortex breakers, probes or other such items associated with pipe-fitting situations are present.

Melville's design uses linkages, which must have very close tolerances, on the order of magnitude of single thousands of an inch or less. Even with close tolerances, the more components a device has, the addition of all component tolerances will add up to adversely affect the device's achievable accuracy. The complexity of Melville's device may decrease achievable accuracy, decrease user friendliness, and has the potential to lead to mechanical problems.

U.S. Pat. No. 5,621,531 to Van Andel (1997) shows a self-alignment sewer pipe laser. Van Adel's devices utilize a retro reflective target and microprocessors, which aim the beam through line motors, adjusting the pipe laser automatically to the target. The self-aligning sewer pipe laser emits a scanning beam. The scanning is discontinued when the reflective portion is located and the beam is aimed in the direction related to the position of the retro reflective target. This device is not intended to be used in smaller pipe applications and is stated to be used in sewer pipe applications. Van Andel's device is to be used internally to pipe applications and is restricted from applications based on the device's size. The device is not suited for applications where self-aligning to a target is not required such as smaller pipes, ducts, and equipment. The complexity of Van Andel's device makes it unsuitable for applications requiring only a visual reference laser beam.

U.S. Pat. No. 6,286,219 to Palumbo, 11 (2001), shows a laser alignment method and apparatus where pipe and similar materials may be aligned. Palumbo's device incorporates the use of a preferred threaded mount holding a laser diode. When installed, the laser diode is capable of projecting a laser beam outward from the centerline axis of the threaded mount, and therefore the centerline axis of the pipe to which the mount is coupled. The device may only be used in mating relationships with pipes or devices having complimentary ends. This limits the Palumbo device from any application not having a connection complimentary to the device mount. The device is not readily adjustable to different size connections without changing the device mount. Each time the device is to be used, the laser diode needs to be mounted on the correctly sized complimentary fixture. It is stated, in a preferred embodiment, the laser apparatus mounting is threaded. Tolerances in standard thread design will cause inaccuracies in the laser beam projection; resulting in an offset for the centerline axis projection.

U.S. Pat. Nos. 6,124,935 (2000) and 5,568,265 (1996) to Matthews incorporate a threaded connection to a collimated, coherent, highly focused narrow light beam. This limits the device from any application not having a threaded connection complimentary to the device. The device is not readily adjustable to different size threaded connections. Each time the device is to be used the laser diode needs to be mounted on the correctly sized complimentary threaded fixture. Tolerances in standard thread design will cause inaccuracies in the beams projection in horizontal, vertical and angular directions; resulting in an offset for the centerline projected axis.

U.S. Pat. Nos. 4,119,382 (1978) and 4,053,238 (1977) to George is a device that operates internal to a conduit projecting a beam as a reference line for construction purposes. The device projects a beam vertically as adjusted to grade. The device uses adjustable legs for both horizontal and vertical movement. This device, could not be used in conjunction with the outer surface of the conduit to achieve a centered light beam reference point.

U.S. Pat. No. 6,151,788 (2000) to Cox is a device used for gun sight alignment by projecting a beam of light out of the gun barrel to be adjusted until it aligns with a dot formed by the beam on the target. The device uses the internal wall of the gun cylinder barrel to align the beam. The device is dimensioned for being slidably received within a gun chamber and therefore is not adjustable to different sized chambers or cylinders.

U.S. Pat. No. 5,432,598 (1995) to Szatkowski declares a device for bore sighting firearms, which is adjustable for different bore sizes. The device projects a light beam, which is centered to the bore of the firearm cylinder. The device works entirely off of the internal walls of the cylinder. The device itself blocks the user from visually verifying correct sure contact.

OBJECTS AND ADVANTAGES

Accordingly, several objects or advantages of my adjustable fit laser-projecting tool are:

(a) To provide a tool which enables the user to project a visible light reference beam or plane(s) perpendicular to a cylindrical object's cross sectional plane within the outer diameter of said cylindrical object parallel to and including the longitudinal centerline axis of said cylindrical object;

(b) To provide a tool which uses the outer surface of a cylindrical object to project a visual light reference beam or plane(s) perpendicular to said cylindrical object's cross sectional plane within the outer diameter of the said cylindrical object parallel to and including the longitudinal centerline axis of said cylindrical object;

(c) To provide a tool which is adjustable to different diameter cylinders;

(d) To provide a tool which will project a visual light reference beam or plane outward from the centerline axis using only a short profile area of the cylindrical object;

(e) To provide a tool to replace or to be used in conjunction with prior art reference tools such as levels, tape rulers, string, plumb bobs, carpenter squares and other straight and square edges in applicable applications;

(f) To provide a tool which is operable by one user;

(g) To provide a tool to decrease the time it takes to verify field dimensions, fabricate, install, spot placement and modify equipment or objects with cylindrical shape;

(h) To provide a tool which provides an accurate reference point, plane or planes projecting perpendicular to a cylindrical object's cross sectional plane within the outer diameter of the said cylindrical object parallel to and including the longitudinal centerline axis of said cylindrical object;

(i) To provide a tool in which the tool's surface contact with the cylindrical object on which the tool is being used, can be verified for correct use by visual inspection;

(j) To provide a tool which is mounted externally so that there is no interference with components internal to the cylindrical object;

(k) To provide a simple user-friendly tool capable of projecting an accurate reference point, plane or planes as specified;

(l) To provide a tool minimizing the number of components; reducing the number of additives clearances for improved accuracy;

(m) To provide a tool which can accept different laser diode modules to increase the tool's useful applications and application effectiveness and;

(n) To provide a tool which, when used properly, will aid in alignment of cylindrical objects and equipment; reducing strain between the objects;

Further objects and advantages of the adjustable fit laser-projecting tool will become apparent from a consideration of the drawings and ensuing description.

SUMMARY

This invention, an adjustable fit laser-projecting reference tool utilizes a laser diode module to project a visible light beam perpendicular to a cylindrical object's cross sectional plane within the outer diameter of said cylindrical object parallel to and including the longitudinal centerline axis of said cylindrical object. The adjustable fit laser-projecting tool can be used to provide a reference point, plane or planes with regards to the centerline axis of any cylindrical object. Cylindrical objects such as pipes, ductwork, and flanges are often installed, modified, lengthened, and connected into, requing a method to reference points off of the original object's centerline axis. Reference points, plane or planes would allow for more accurate measurements to be taken for fabrication, installation, or visual reference. The adjustable fit laser-projecting tool will allow for one individual to operate and take down information, such as dimension measurements for fabrication, where prior tools such as tape measures, levels and carpenter squares may require more than one individual to take accurate information. The adjustable fit laser-projecting tool is adjustable to accommodate different diameter cylinders and utilizes only a small profile contact area on the outer surface of the cylindrical object. The adjustable fit laser projecting reference tool will aid in the proper alignment of cylindrical objects and equipment to reduce strain between the objects.

DRAWINGS

Drawing Figures

Figure 3:
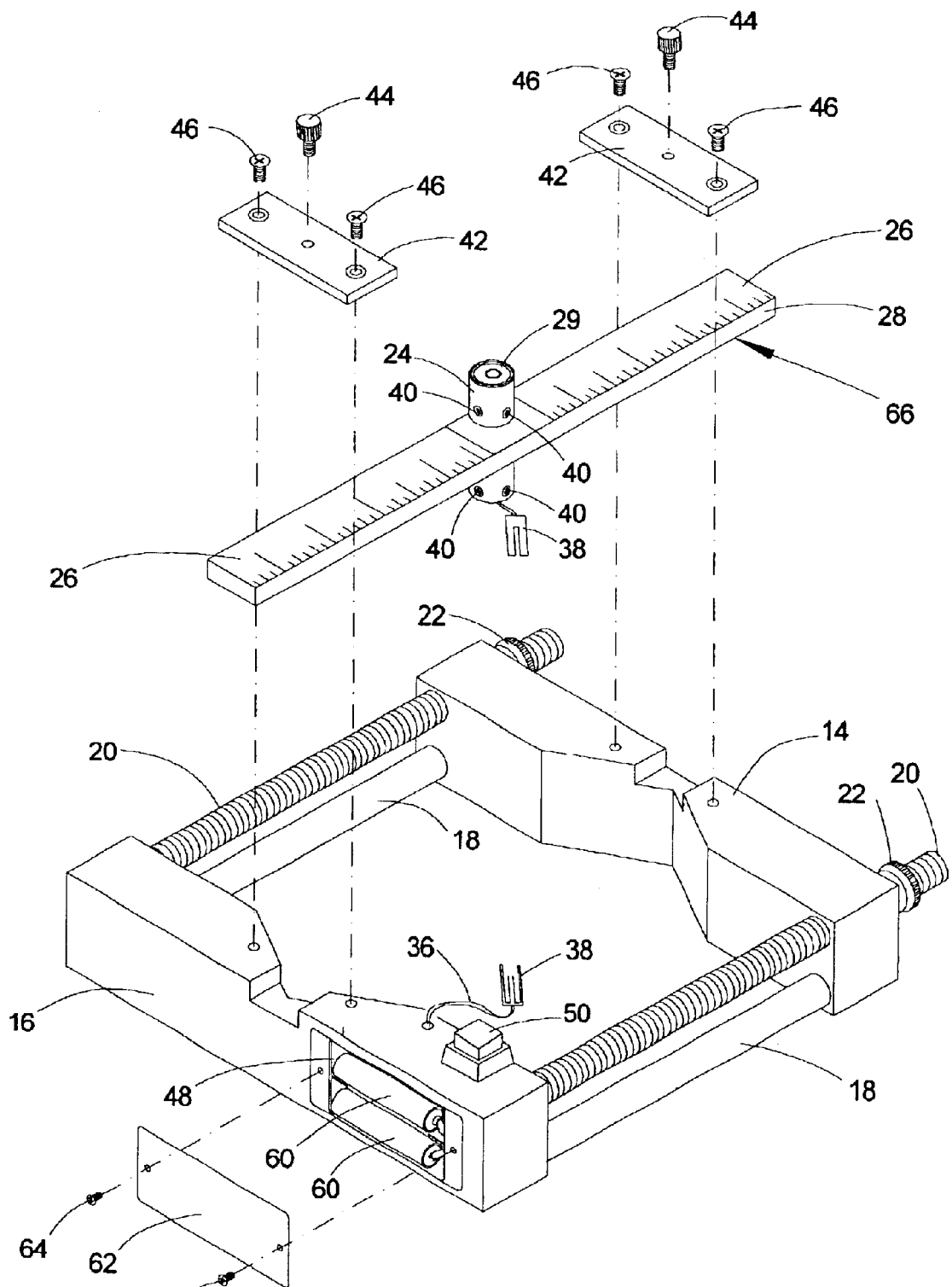

FIG. 3 is an isometric exploded front view with slide scale body assembly removed from the guide track in the top and bottom v-blocks. The view shows how the slide scale assembly can be removed and replaced with another slide scale assembly. The slide scale assembly is shown being removed by unscrewing the slide scale brackets and disengaging the power source plug. FIG. 3 shows the power source cover removed; exposing the power source and power source holder.

Figure 4:
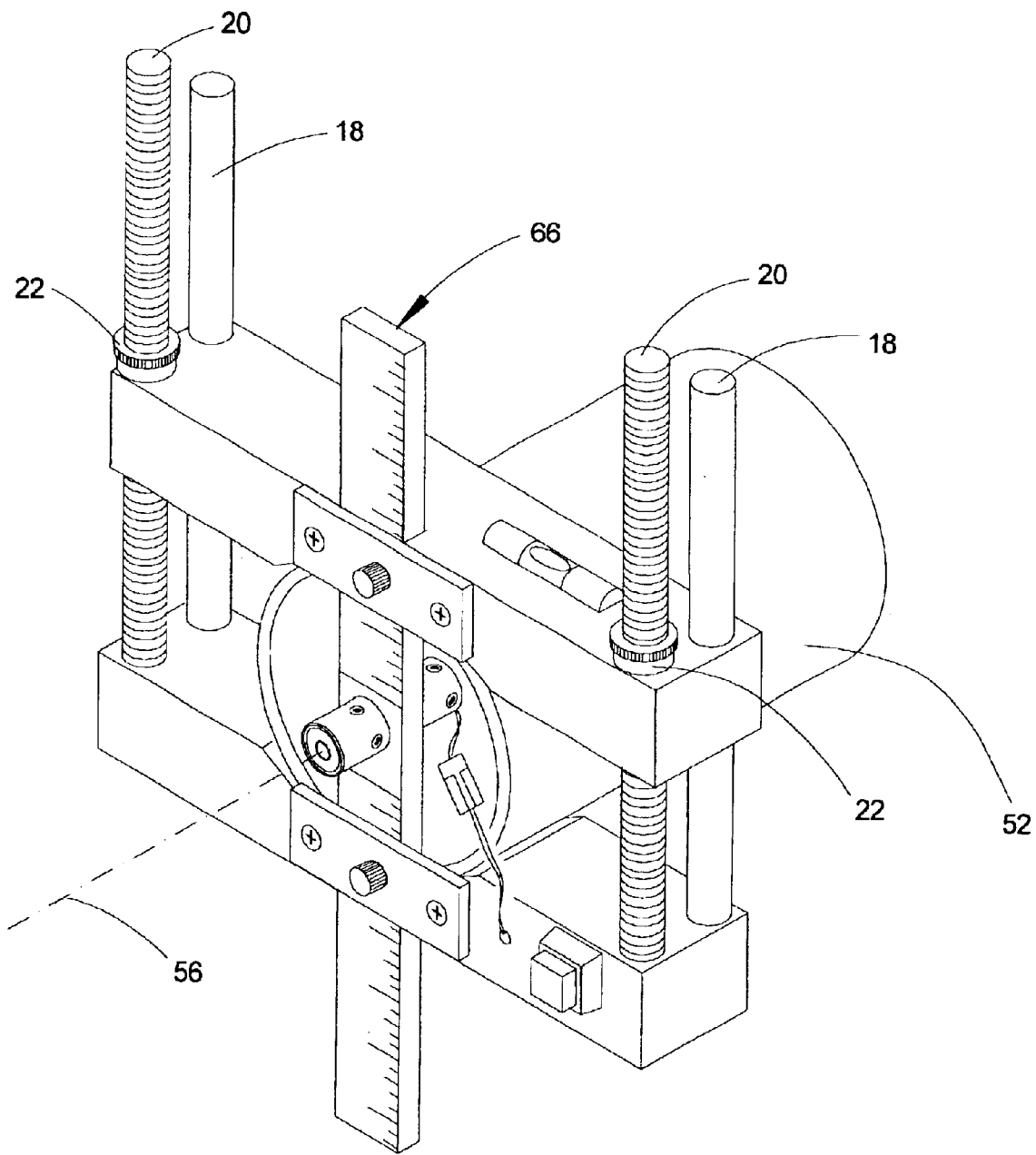

FIG. 4 is an isometric front view of the assembled adjustable fit laser projecting reference tool fitted on a small diameter cylindrical object. FIG. 4 is used to show the tool's adjustability.

Figure 5:
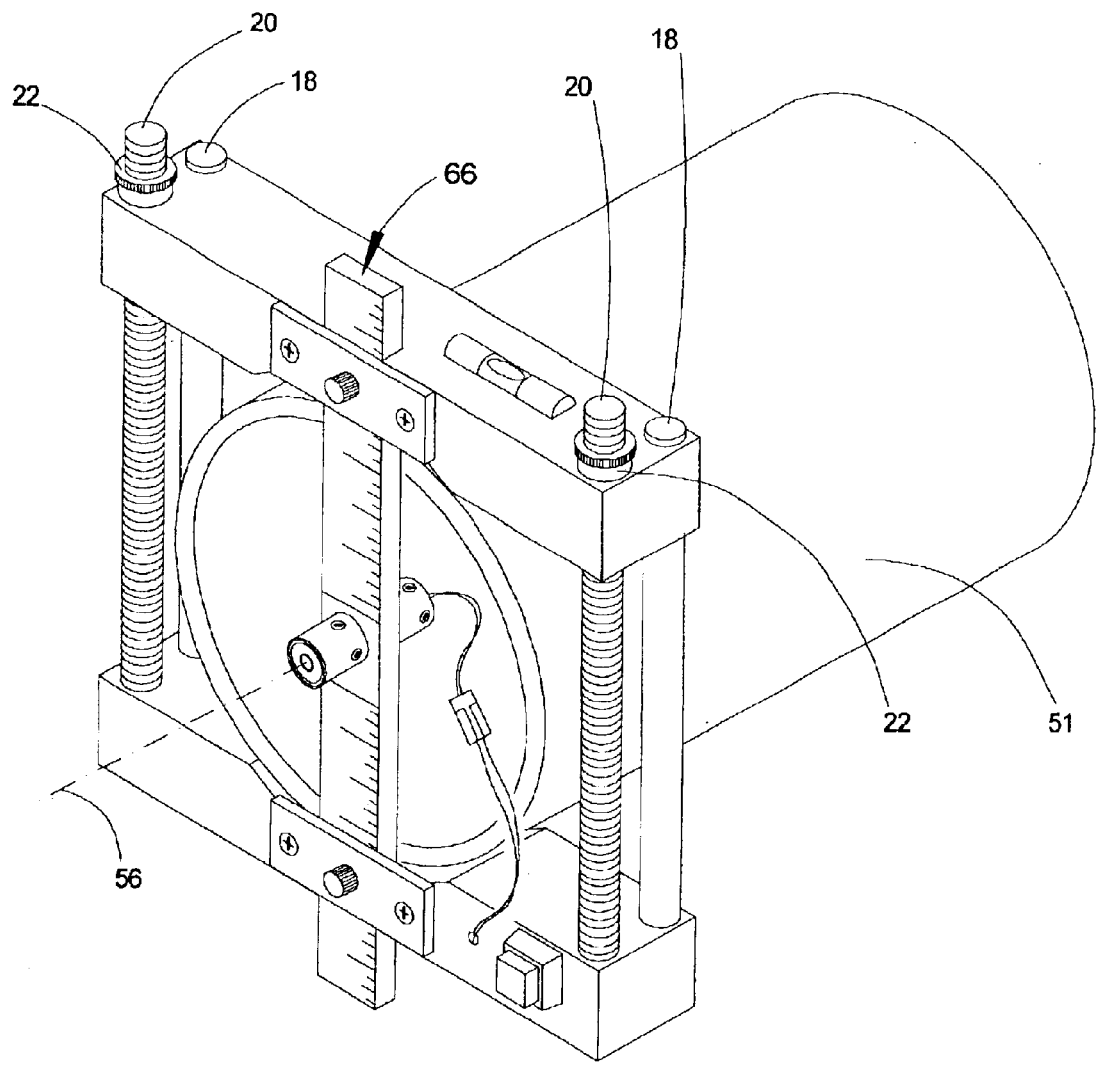

FIG. 5 is an isometric front view of the assembled adjustable fit laser projecting reference tool fitted on a larger diameter cylindrical object. FIG. 5 is used to show the tool's adjustability.

Figure 6:
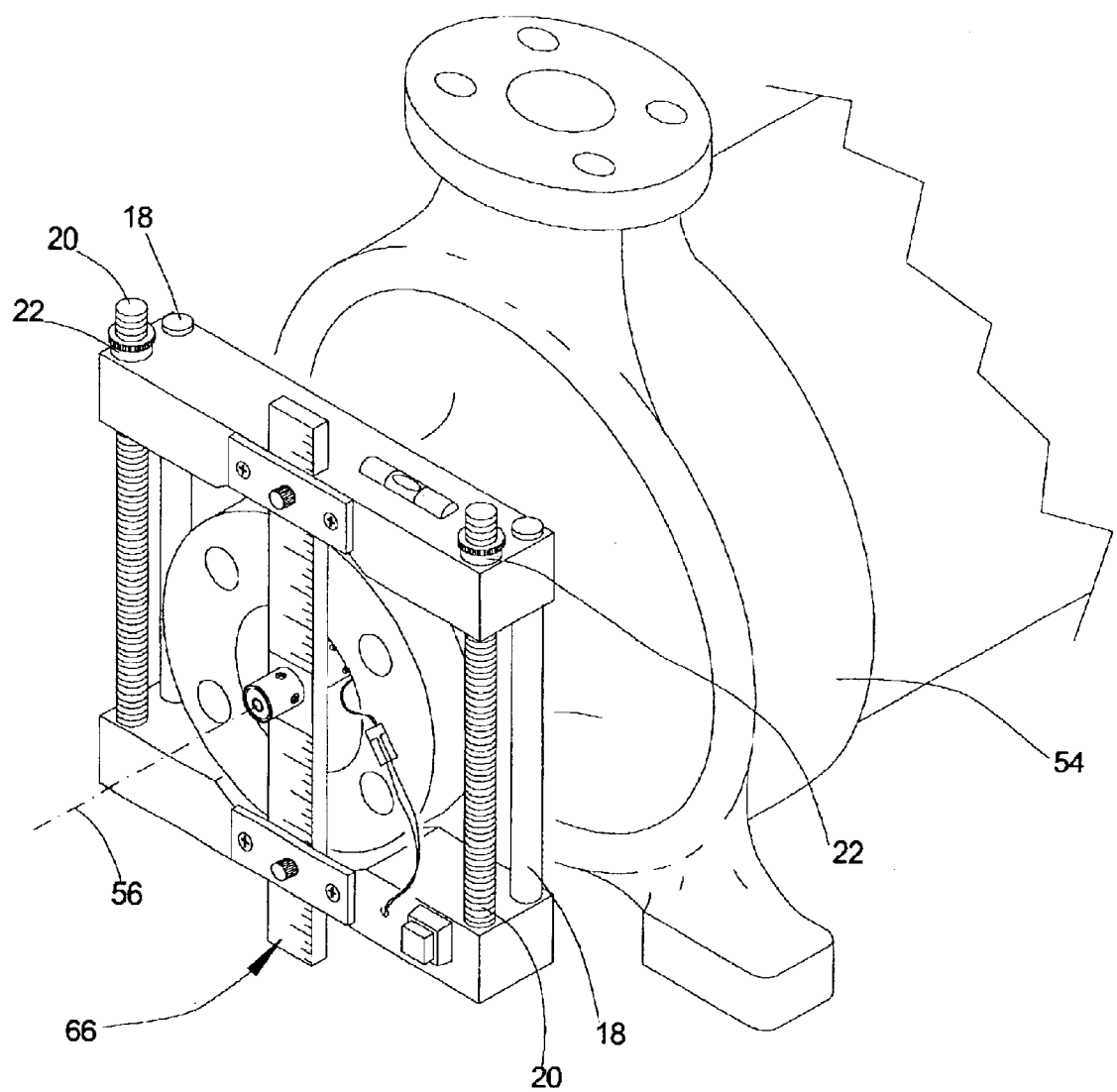

FIG. 6 is an isometric front view of the assembled adjustable fit laser projecting reference tool fitted on a piece of equipment with a cylindrical flange. FIG. 6 is used to show the tool's adjustability and versatility.

Figures 7, 8:
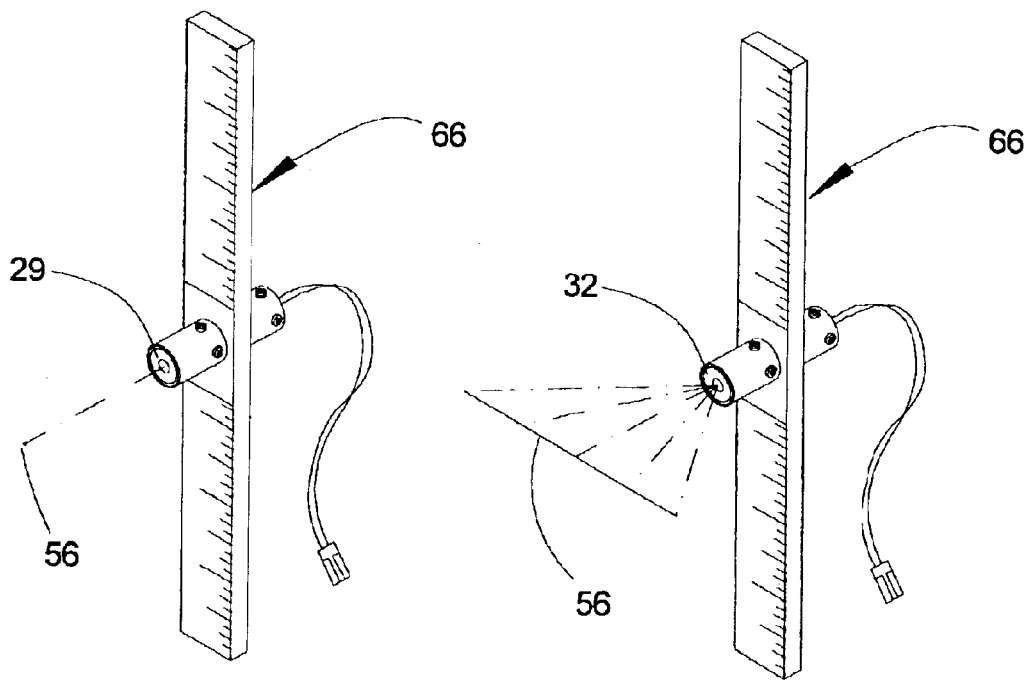

FIG. 7 is an isometric front view of the slide scale assembly with a dot generating laser diode module. FIG. 7 shows the projection of the light beam and the light beam's cross-section from the laser diode module.

FIG. 8 is an isometric front view of the slide scale assembly with a horizontal line generating laser diode module. FIG. 8 shows the projection of the light beam and the light beam's cross-section from the laser diode module.

Figures 9, 10:
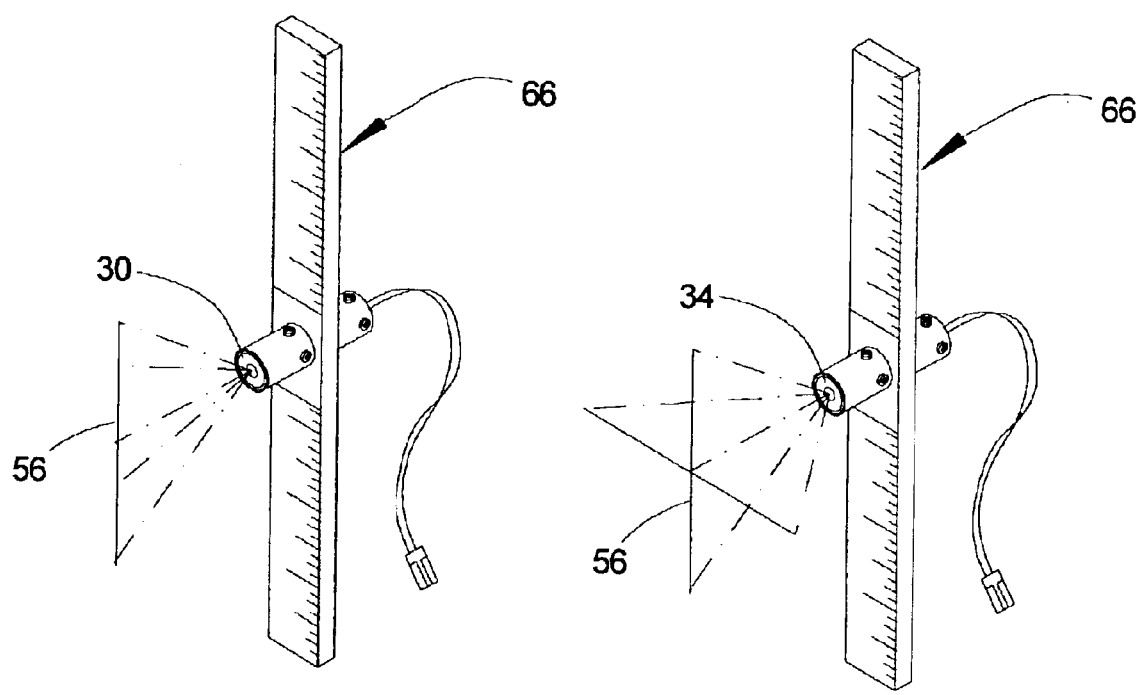

FIG. 9 is an isometric front view of the slide scale assembly with a vertical line generating laser diode module. FIG. 9 shows the projection of the light beam and the light beam's cross-section from the laser diode module.

FIG. 10 is an isometric front view of the slide scale assembly with a crosshair generating laser diode module. FIG. 10 shows the projection of the light beam and the light beam's cross-section from the laser diode module.

REFERENCE NUMERALS IN DRAWINGS

14 Top V-Block
16 Bottom V-Block
18 V-Block Guide Rod
20 V-Block Clamping Rod
22 Clamping Rod Nut
24 Laser Diode Module Adjustment Cylinder
26 Centering Scale
28 Slide Scale Body
29 Laser Diode Module Dot Generator
30 Laser Diode Module Vertical Line Generator
32 Laser Diode Module Horizontal Line Generator
34 Laser Diode Module Crosshair Generator
36 Power Wires
38 Power Source Plug
40 Laser Diode Module Adjustment Screw
42 Slide Scale Bracket
44 Slide Scale Thumb Screw
46 Bracket Screws
48 Power Source Holder
50 Power Switch (on / off)
51 Large Cylindrical Object
52 Small Cylindrical Object
54 Equipment
56 Light Beam
58 Level Vial
60 Power Source
62 Power Source Cover
64 Power Source Cover Screw
66 Slide Scale Assembly

DETAILED DESCRIPTION

Figure 1:
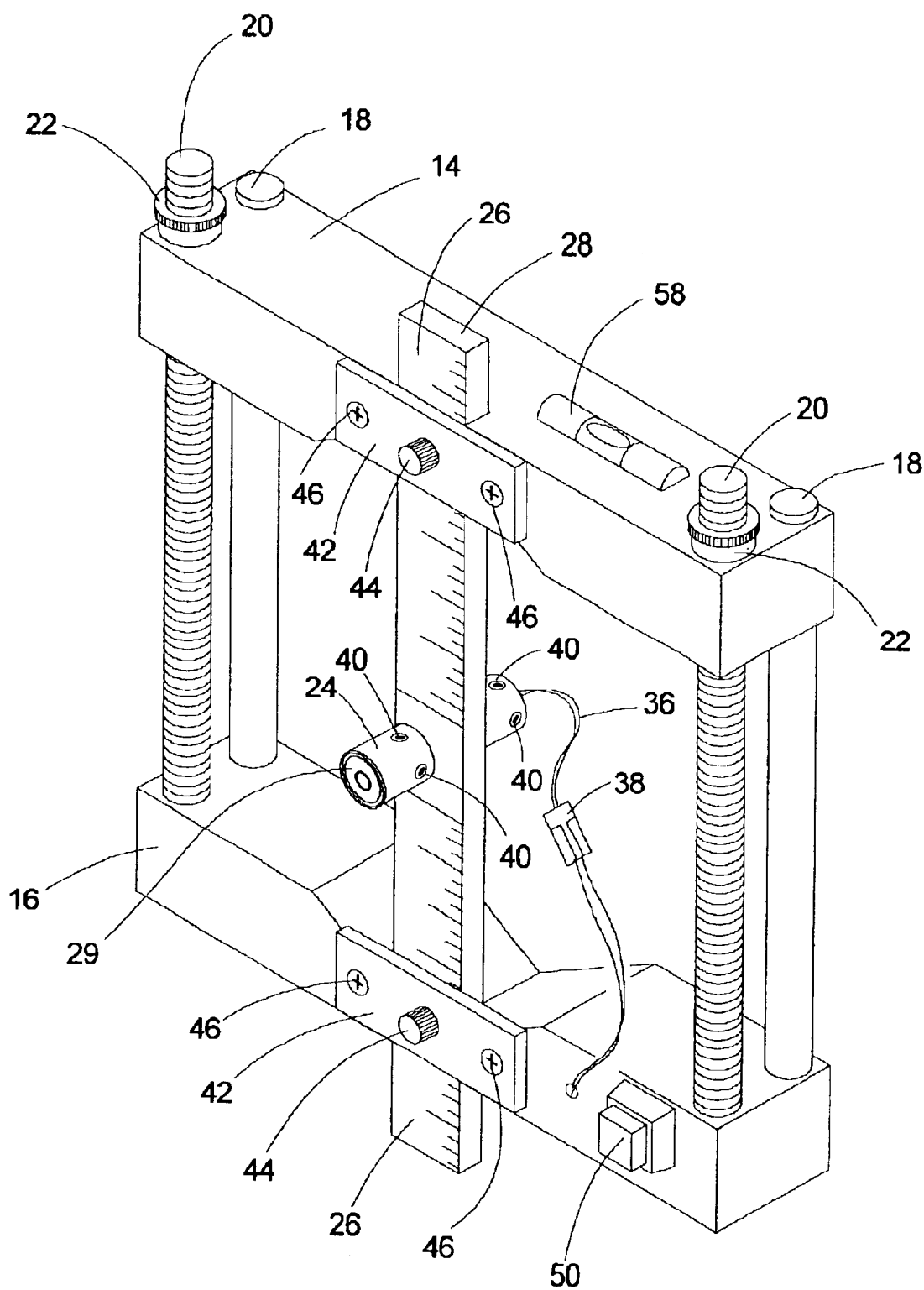
FIG. 1 is an isometric front view of the assembled adjustable fit laser projecting reference tool.

FIG. 1 is a front, right side isometric view of the adjustable fit laser-projecting tool as it appears in the assembled working form. The front of the adjustable fit laser-projecting tool is considered to be the side which the laser diode module 29 projects the light beam 56 outwardly perpendicular to a cylindrical object's cross sectional plane within the outer diameter of said cylindrical object parallel to and including the longitudinal centerline axis of said cylindrical object, parallel to the centerline axis of the object. The laser diode module 29 can be changed to laser diode module vertical line generator 30, a laser diode module horizontal line generator 32 or a laser diode module crosshair generator 34 by replacing the slide scale assembly 66. This is shown in FIG. 3. FIG. 1 shows the orientation of the top v-block 14 and bottom v-block 16 as compared to the slide scale assembly 66 as seen in FIGS. 3, 7, 8, 9 and 10, with the slide scale brackets 42 holding the slide scale assembly 66 in place. The slide scale brackets 42 use bracket screws 46 to attach the slide scale brackets 42 to the top v-block 14 and bottom v-block 16. FIG. 1 shows the top surface of the top v-block 14 with a level vial 58 set in the body of the top v-block 14. The centering scales 26 are shown affixed to the slide scale body 28, as is the laser diode module adjustment cylinder 24. Held by the laser diode adjustment screws 40 integrated into the laser diode adjustment cylinder 24 is the laser diode module 29, 30, 32, or 34. FIG. 1 shows the power switch 50 that is connected to the power wires 36 internal to the bottom v-block 16. The power wires make up a circuit between the power source 60, through the power switch 50 and through the power source plug 38 to the laser diode module 29, 30, 32, or 34. The plug enables different slide scale assemblies 66 shown in FIGS. 7, 8, 9, and 10 containing different laser diodes modules 29, 30, 32, or 34 to be installed in the top and bottom v-block slide scale assembly guide tracks. FIG. 1 shows the assembled view of the top v-block 14 and bottom v-block 16 in relation to the v-block guide rods 18 and v-block clamping rods 20 and clamping rod nuts 22. The top v-block 14 slides along parallel the v-block guide rods 18 for adjustability, shown in FIGS. 4, 5, and 6. The clamping rod nuts 22 hold the top v-block 14 against a cylindrical surface while the bottom v-block 16 is forced against the opposite side of the cylindrical object. The clamping action is shown in FIGS. 4, 5, and 6.

Figure 2:
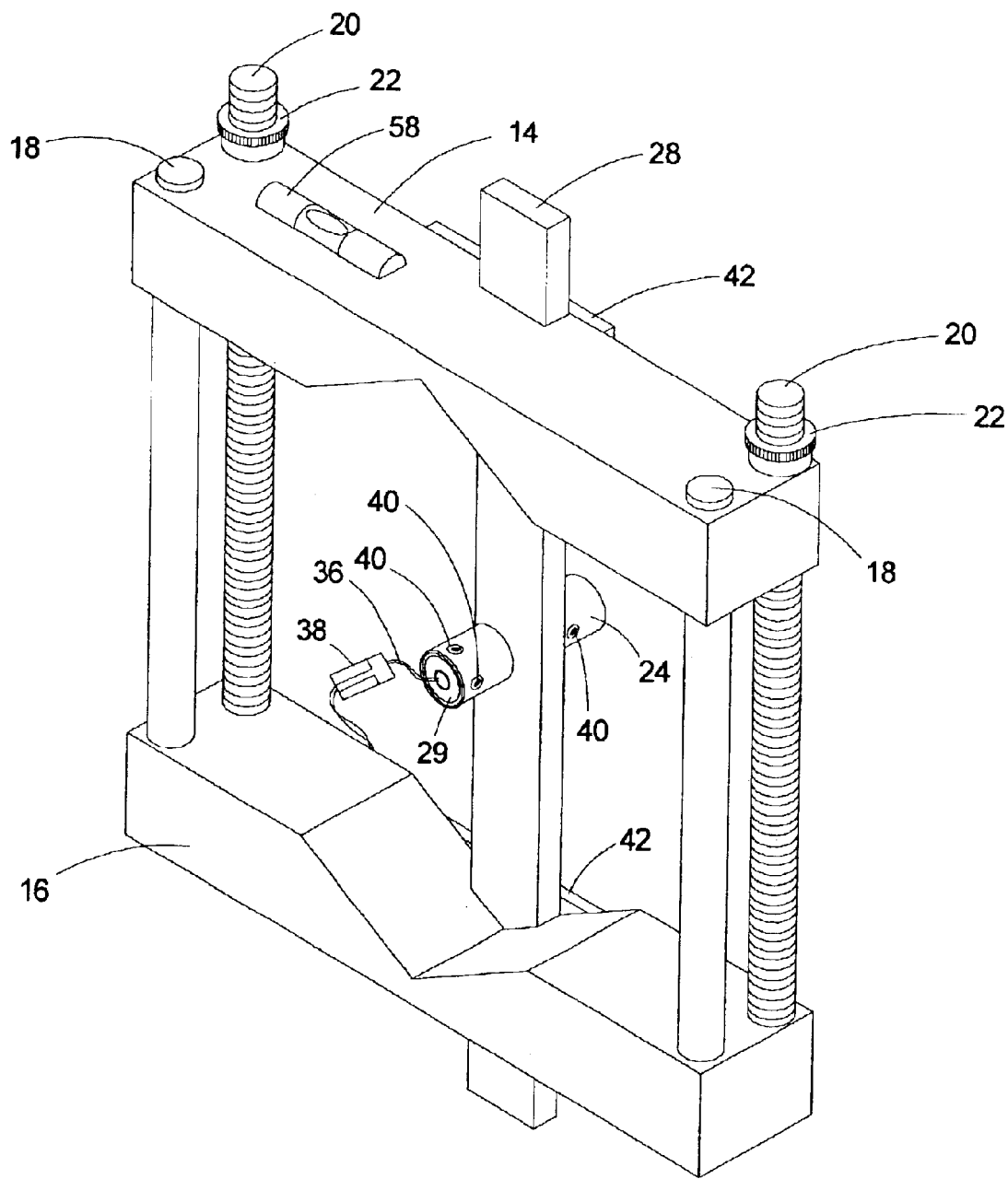
FIG. 2 is an isometric back view of the assembled adjustable fit laser projecting reference tool.

FIG. 2 is an isometric rear view of the adjustable fit laser-projecting reference tool as it appears in the assembled working form FIG. 2 shows the rear of the laser diode module adjustment cylinder 24 and the laser diode adjustment screws 40. The laser diode adjustment screws 40 are used to center the light beam 56 minimizing horizontal, vertical and angular offset to the center of the laser-projecting reference tool. FIG. 2 shows the relative position of the top v-block 14, bottom v-block 16, slide scale assembly 66, v-block guide rods 18, v-block clamping rods 20 and clamping rod nuts 22 to each of the components. FIG. 2 shows the top surface of the top v-block 14 with a level vial 58 set in the body of the top v-block 14. FIG. 2 shows the power wires 36 and power source plug 38 from a rear view. FIG. 2 shows the connection of the power wires 36 to the laser diode module 29, 30, 32 or 34. The slide scale brackets 42 are not seen in detail from the FIG. 3 rear isometric view.

FIG. 3 is an isometric exploded view showing the front, right and bottom sides of the adjustable fit laser-projecting reference tool. FIG. 3 shows the slide scale assembly 66 detached from the top v-block 14 and bottom v-block 16. The slide scale assembly 66 is removable by unscrewing the bracket screws 46 and removing the slide scale brackets 42. The power source plug 38 male end is unplugged from the female end disconnecting the slide scale assembly 66 from the bottom v-block 16 and power source 60. FIG. 3 shows how the slide scale assembly 66 can be removed and reinstalled. This feature is important to repair or replace the slide scale assembly 66. The interchangeability of slide scale assembly 66 is necessary for the changing of laser diode modules with different light beam cross-section projections. The slide scale assemblies 66 containing different laser diode modules 29, 30, 32 and 34 as shown in FIGS. 7, 8, 9 and 10. Removal of the power source cover 62 by unscrewing the power source cover screws 64 allows the user to replace the power source 60 when needed. In FIG. 3 the power source 60 is shown to be a common battery, which is held in the power source holder 48.

FIG. 4 is an isometric view of how the adjustable fit laser-projecting reference tool would be clamped on the outer surface of a cylindrical object 52. In FIG. 4 the tool is clamped on a small diameter cylinder 52 and in FIG. 5 the device is clamped on a larger diameter cylinder 51 to show the tool is adjustable. The device is shown in FIG. 6 to be clamped on a piece of equipment 54 showing the tool is adjustable and useful on any cylindrical object. The different positions of the top v-block 14 relative to the v-block guide rod 18, v-block clamping rod 20 and v-block clamping nut 22, and slide scale assembly 66 are shown in FIGS. 4, 5 and 6 for a visual understanding of the tools adjustability and usefulness.

FIGS. 7, 8, 9, and 10 are isometric views of the slide scale assembly 66 with different laser diode modules. FIG. 7 shows a laser diode module dot generator 29.

FIG. 8 shows a laser diode module horizontal line generator 32. FIG. 9 shows a laser diode module vertical line generator 30. FIG. 10 shows a laser diode module crosshair generator 34. Each slide scale assembly 66 fits into the top v-block 14 and bottom v-block 16 slide scale assembly channels. The slide scale assembly 66 is held in position by the slide scale brackets 42 and bracket screws 46.

Operation—FIGS. 4, 5, 6

To use the adjustable fit laser-projecting took the object of which the tool will be placed around should be measured for size. The diameter of the cylinder cannot be larger than the top v-block 14 and bottom v-block 16 can be extended on the v-block guide rod 18 or v-block clamping rod 20. There is also a maximum diameter, which will fit between the v-block guide rods 18 and v-block clamping rod 20. There is also a minimum diameter the top v-block 14 can be clamped down to the bottom v-block 16 without the top v-block 14 coming into physical contact with the bottom v-block 16. If the top v-block 14 comes in direct contact with the bottom v-block 16 the minimum diameter has been exceeded. When this happens, the clamping force of the v-groove found between the top v-block 14 and bottom v-block 16 will not be sufficient to maintain correct contact with the outer surface of the cylindrical object on which the tool is being placed. When it is clear the tool will fit on the cylindrical object, the top v-block 14 should be extended away from bottom v-block 16 to a distance where the tool can be placed around the cylindrical object as seen in FIGS. 4, 5, and 6. Make sure the slide scale thumb screws 44 are loose enough so that the slide scale assembly can be moved without damaging the scale thumb screws 44 or centering scale 26 face. Using the clamping rod nuts 22 the top v-block 14 can be clamped into place by turning the clamping rod nut 22 clockwise. This will force the top v-block 14 v-groove to engage the cylindrical object on which the tool is placed. As the first v-block makes contact with the cylindrical object, continue turning the clamping rod nut 22 clockwise; forcing the second v-block into place. The v-grooves machined into each of the v-blocks will, when fully clamped around a cylinder, adjust the tool to be positioned equally around the cylindrical object. At this point the center of the slide scale assembly 66 will intersect the centerline of the cylindrical object.

With the top v-block 14 and bottom v-block 16 clamped into place by the v-block clamping rod 20 and clamping rod nuts 22 the slide scale assembly 66 can be moved to a desired position in reference to the cylindrical object. This positioning, in most cases, would be the centerline axis of the cylindrical object. Make sure the slide scale thumb screws 44 are loose enough so that the slide scale assembly 66 can be moved without damaging the scale thumb screws 44 or centering scale 26 face. If the slide scale thumbscrews 44 need to be loosened, turn them counterclockwise. Use the center scales 26 increments to move the slide scale assembly into position by referencing the increments against the bottom or top of the slide scale brackets 42. Move the centering slide scale assembly 66 to the desired position and tighten the slide scale thumbscrews 44 by turning the slide scale thumbscrew 44 clockwise. This will hold the slide scale assembly 66 in place while using the tool for the desired application.

With the v-blocks clamped around the cylindrical object and the centering slide scale assembly 66, in place the adjustable fit laser-projecting tool's power source 60 can be turned on. Make sure the power source plug 38 is connected securely. Turn the power switch 50 to the "on' position closing the electrical circuit.

The laser diode module 29, 30, 32, and 34 will then project a light beam 20, plane or planes perpendicular to a cylindrical object's cross sectional plane within the outer diameter of said cylindrical object parallel to and including the longitudinal centerline axis of said cylindrical object.

Verify that all components are secure.

If the v-block clamped to the cylinder can be moved, wobbled or shifted by hand the contact surfaces are not in sufficient physical contact. The tool should be removed and reinstalled. The surface contact between the tool and cylindrical surface can also be visually inspected for correctness The projected light beam can be used in such activities as taking dimension, visual reference, spotting equipment, alignment, fabrication and bore sighting.

Conclusion, Ramifications, and Scope

Accordingly, the reader will see the adjustable fit laser-projecting tool provides a new, reliable, time saving way to accurately aid in the visual referencing of points or planes while manufacturing, fabricating, installing, dimension taking or similar activities around cylindrical objects.

While the above description contains much specificity, these should not be construed as limitations on the scope of the adjustable fit laser-projecting tool, but rather as an exemplification of one preferred embodiment thereof. Many other variations are possible. For example, the tool may be manufactured from numerous materials. There can be differences in the clamping method applied to the v-blocks. The tool itself can take a different shape, color or surface texture. The components of the tool may connect or associate with adjacent components in a different manner. The size may vary to accommodate different size cylinders. Power sources may vary, alternating current, direct current, solar power and battery.

What is claimed is:

1. An adjustable fit laser-projecting reference tool comprising:

a light beam means connected to a self-contained power source through an electrical circuit whereby said electrical circuit can be operated to closed or open said electrical circuit; and, a mounting means whereby said mounting means functions to attach said light beam means to any diameter of a cylindrical object; and, said mounting means functions to dispose said light beam means to project a light beam perpendicular to said cylindrical object's cross sectional plane within the outer diameter of said cylindrical object parallel to and including the longitudinal centerline axis of said cylindrical object; and, said mounting means functions to attach said light beam means to said cylindrical object and disposes said light beam means perpendicular to said cylindrical object's cross sectional plane within the outer diameter of said cylindrical object parallel to and including the longitudinal center axis of said cylindrical object; and, said mounting means disposes a top v-block and a bottom v-block to the outer surface of said cylindrical object wherein said top v-block and said bottom v-block are self-aligning so that said top v-block can be moved in a sliding fashion with respect to said bottom v-block by v-block guide rods disposed to maintain self parallel alignment between said top v-block and said bottom v-block; and, said top v-block and said bottom v-block surrounds said cylindrical object and sandwiches said cylindrical object urging said cylindrical object's centerline to the same plane as the centerline of said top v-block and said bottom v-block; and, said top v-block and said bottom v-block include a guide track for a slide scale assembly so that said slide scale assembly can be slidably disposed between said top v-block and said bottom v-block perpendicular to the longitudinal centerline of said cylindrical object when the adjustable fit laser-projecting reference tool is attached to said cylindrical object; and, a slide scale bracket to position said slide scale assembly as required by the user with said slide scale bracket being removable allowing said slide scale assembly to be interchangeable; and, said guide track allows said slide scale assembly to slide in a manner in which said slide scale assembly's center point has the ability to pass through the projected longitudinal centerline of said cylindrical object; and, a v-block clamping rod is held fixed to said bottom v-block and is allowed to slide through said top v-block with a clamping rod nut engaged on said v-block clamping rod disposed to urge said top v-block slidably towards said bottom v-block when said clamping rod nut is turned clockwise on said v-block clamping rod.

2. The adjustable fit laser-projecting reference tool of claim 1 wherein said self-contained power source through said electrical circuit which can be operated to closed or open said electrical circuit and an electrical circuit power source plug can be disconnected from said light beam means in order to configure said adjustable fit laser-projecting tool with a multitude of light beams means.

3. The adjustable fit laser-projecting reference tool of claim 1 wherein said mounting means functions to dispose said light beam means to project said light beam means perpendicular to said cylindrical object's cross sectional plane within the outer diameter of said cylindrical object parallel to and including the longitudinal center axis of said cylindrical object; and, said mounting means includes said light beam means and a centering scale wherein increments start at the center and continue outward to opposing ends, and, said mounting means consists of a slide scale assembly wherein said slide scale assembly slidably joins said top v-block and said bottom v-block by a guide track whereby said slide scale assembly intersects said center axis of said cylindrical object; and, a laser diode module adjustment cylinder to be calibrated to project said light beam from the center of said laser diode module adjustment cylinder and perpendicular to said cylindrical object's cross sectional surface when said adjustable fit laser-projecting reference tool is attached to said cylindrical object.

* * * * *

UNITED STATES PATENT AND TRADEMARK OFFICE
CERTIFICATE OF CORRECTION

PATENT NO. : 6,823,600 B1 Page 1 of 1
DATED : November 30, 2004
INVENTOR(S) : Jason Michael Vaughan It is certified that error appears in the above-identified patent and that said Letters Patent is hereby corrected as shown below:

<u>Title page,</u>
Item [75], Inventors, change "Ronlroff" to -- Roncroff --.

Signed and Sealed this

Nineteenth Day of April, 2005

JON W. DUDAS
*Director of the United States Patent and Trademark Office*